Figure 1:
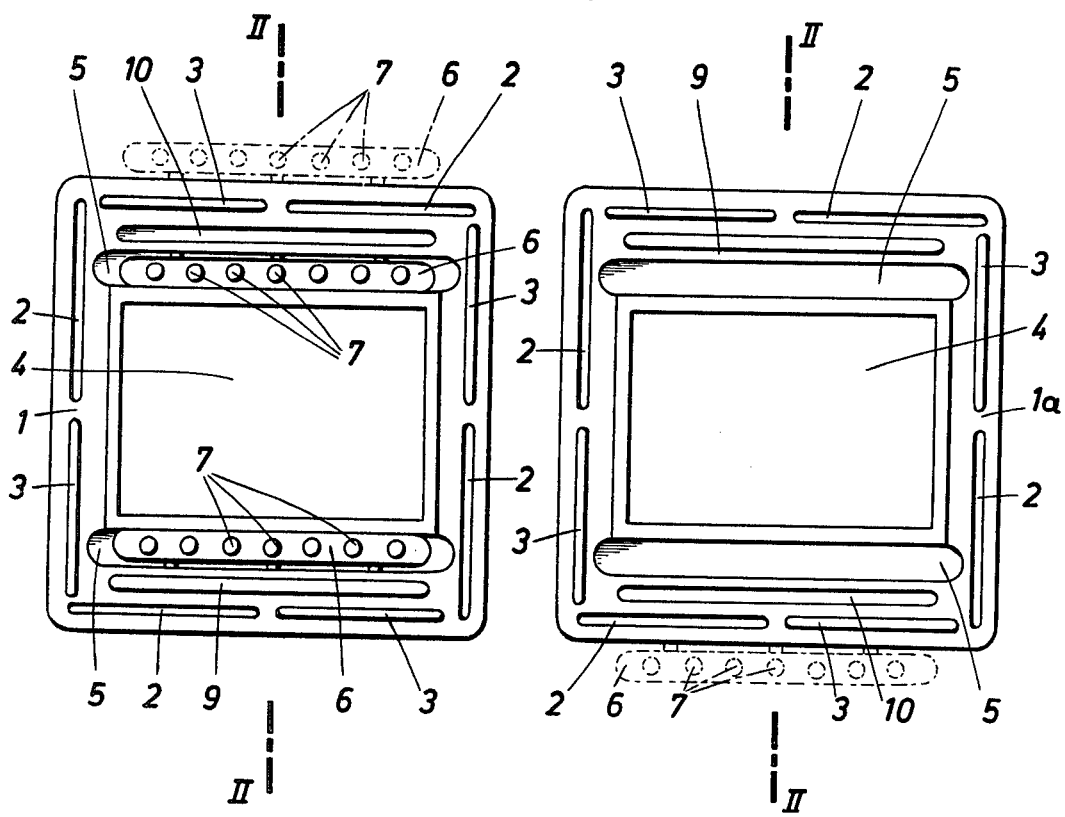

United States Patent [19]

Hrabik

[11] 4,104,818
[45] Aug. 8, 1978

[54] SLIDE FRAME

[75] Inventor: Heinrich Hrabik, Linz, Austria

[73] Assignee: Bonum-Werk Inh. Friedrich Hetzmannseder, Linz, Austria

[21] Appl. No.: 745,074

[22] Filed: Nov. 26, 1976

[30] Foreign Application Priority Data

Sep. 2, 1976 [AT] Austria .................................. 6521/76

[51] Int. Cl.² ............................................ G09F 13/00
[52] U.S. Cl. ..................................................... 40/152
[58] Field of Search .................. 40/152, 159, 158, 155

[56] References Cited

U.S. PATENT DOCUMENTS

| | | | |
|---|---|---|---|
| 1,567,310 | 12/1925 | Weeks | 40/152 |
| 2,088,944 | 8/1937 | Young et al. | 40/152 |
| 2,823,478 | 2/1958 | Ostergaard | 40/152 |
| 3,681,866 | 8/1972 | Loersch | 40/152 |
| 3,808,722 | 5/1974 | Byers | 40/152 |

Primary Examiner—Russell R. Kinsey
Assistant Examiner—Wenceslao J. Contreras
Attorney, Agent, or Firm—Kurt Kelman

[57] ABSTRACT

A slide frame is comprised of two component frames snapped together to clamp a slide film therebetween. The slide film has perforations on opposite sides thereof and arranged to extend along two opposite parallel sides of a window defined by the slide frame, the perforations having edges remote from the parallel sides. Two film spreading bars are arranged between the joined component frames along the two opposite parallel sides for limited longitudinal displacement in the direction of the sides and each of the bars has teeth for interengaging with the perforations in the slide film. The spreading bars are held between the component frames with their teeth engaging the remote edges of the film perforations whereby the film is held under tension between the component frames.

4 Claims, 4 Drawing Figures

SLIDE FRAME

This invention relates to a slide frame comprising two component frames which consist of plastics material and define a window each and can be joined together so as to clamp a slide film between them in such a manner that the slide film is held in a plane between two spreading bars, which are mounted for a limited sliding movement along the longitudinal edges of the windows and have teeth which enter perforations in the slide film.

Various types of slide frames are known in which the two component frames are either entirely identical and provided with coupling elements which cooperate like a snap fastener, or the two component frames are hinged together and can be closed like a door or window. These slide frames have the advantage that they can quickly and easily be handled to mount the slides because it is sufficient to place the slide film on one component frame and then to press the second component frame to its closed position. In unglazed slide frames, the film is held only at its edges, where it is clamped between the component frames, and may warp or distort under the action of heat and/or moisture. This deformation of the slide film will obviously result in a projected picture which is locally unsharp. Where glazed slide frames are used, the same actions may cause the appearance of Newton's rings.

In an effort to eliminate the interference which results in the appearance of Newton's rings, a slide frame has been disclosed (Printed German Application No. 1,285,766), in which the slide film is spread between two spreading bars which are mounted for a limited sliding movement along the longitudinal edges of the windows and have teeth which enter the perforations of the slide film so that the film cannot warp even under the action of heat and air layers of varying thickness cannot occur between the glasses of the slide frames and the film. In these slide frames, the film is spread by a spring which abuts one component frame and urges one of the two spreading bars away from the window of the slide frame. As a result, the film mounted on the spreading bars is always held under the tension which is determined by the spring which can thus take up a thermal expansion of the film. That known arrangement has the disadvantage that the film is always stressed by a tensile force which is applied at the perforations of the film and substantially only at discrete points and for this reason tends to form undulations in the film and to damage the film at its perforations. The spring force must be relatively strong when it is desired not only to take up a thermal expansion of the film but also to avoid a warping of the film under the action of heat because the film tends to shorten as it warps and this can be prevented only by a spring which does not yield to such shortening. Besides, the action of heat which accompanies any slide projection precludes the use of springs of plastics material so that steel springs must be used. Moreover, although one of the two spreading bars is spring-biased, that spreading bar must still be slidable parallel to the longitudinal edge of the window so that the desired sectional area of the film can be registered with the window. This may result in a unilateral loading of the spreading bar so that the film may be distorted. Another disadvantage resides in that it is difficult to insert the film because it is necessary for this purpose to urge the spreading bars toward each other against the spring force. This operation cannot easily be performed owing to the confined space. The basic disadvantages of that known slide frame and the fact that such slide frames cannot be mass-produced in a simple process have been the reasons why these slide frames have not proved satisfactory in practice.

It is an object of the invention to improve slide frames of the kind mentioned first hereinbefore with simple means and in such a manner that the slide frame can be mass-produced and the slide film inserted in the slide frame cannot be distorted or warped.

This object is accomplished according to the invention in that, upon joining the component frames to form the slide frame, both spreading bars are restrained against movement towards each other so as to reduce the distance between the spreading bars. Because the spreading bars are restrained only against a displacement toward each other, the film mounted in the slide frame according to the invention is not stressed in tension when the film is flat. The spreading bars hold the film in a flat condition because the distance between the outer flanks of the teeth matches the distance between the outer edge portions of the perforations. A warping of the film under the action of heat which accompanies the projection would reduce the distance between the longitudinal edges of the film. This is prevented by the spreading bars, which are restrained so that they cannot yield and have teeth which interengage with the perforations. Surprisingly it has been found that thermal expansion resulting in an increase in length are of minor significance for the distortion or warping of the film, particularly because the slide frame expands too under the action of heat. For this reason, it is sufficient to hold the film flat by the spreading bars so that the film will be stressed in tension only when the film tends to warp owing to its laminated structure. For this purpose, the spreading bars must be restrained. This can be accomplished in a simple manner, e.g., in that the spreading bars are inserted in a mating groove of one component frame. Alternatively, the two spreading bars may be joined to form a frame so that they restrain each other because it will be sufficient to ensure that a predetermined distance between the spreading bars is maintained.

If the film is just held flat by the unbiased spreading bars without application of force, difficulties might arise as the slide film is applied to the teeth of the spreading bars because there would then be no clearance between the outer tooth flanks and the outer edge portions of the perforations. The film can easily be mounted in such slide frame if, according to a preferred feature of the invention, at least one spreading bar is adapted to be forced away from the adjoining longitudinal edge of the window by a suitably inclined camming surface as the component frames are joined. If the slide film is held in its desired spread position only when the clamping bar is or the clamping bars have been forced outwardly, there will be a sufficiently large clearance when the component frames are open so that the film can then be applied to the teeth of the spreading bars and the interengagement of the teeth with the outer edges of the perforations will be effected only by the closing of the component frames, which causes at least one spreading bar to be forced to its operative position by an inclined camming surface.

In an alternative arrangement, the insertion of a slide film into a slide frame according to the invention is facilitated in that in at least one spreading bar at least those tooth flanks which face away from the window are inclined away from the window and toward the roots of the teeth. In that case, the slide film will not be unyieldingly held until it has engaged the root portions of the teeth so that the clearance at the tips of the teeth is sufficient for the application of the film. As the component frames are closed, the film is forced over the inclined tooth flanks onto the root portions of the teeth and is held there as desired.

It will be particularly favorable if the inclined tooth flanks merge adjacent to the root of each tooth into a portion which is normal to the window plane or film plane. The presence of the tooth flank portion which is at right angles to the window plane or film plane ensures that the final position of the slide film applied to the teeth is not significant for the engagement between the tooth flanks and the outer edges of the perforations because in the closed frame the film perforations will always be disposed adjacent to the tooth flank portion which is at right angles to the film plane rather than adjacent to the inclined tooth flank portion. For this reason the height of that vertical portion preferably exceeds the thickness of the film.

To ensure a proper holding of the film, the latter must be pressed by one component frame against the spreading bars in the other component frame. A permanent interengagement between the teeth of the spreading bars and the perforations of the slide film can be additionally ensured in a simple manner by the provision of projections and/or recesses, whih are arranged beside the spreading bars and closely spaced therefrom and parallel thereto and constitute coupling elements for cooperation with mating recesses and/or projections of the other component frame.

According to a further preferred feature of the invention the spreading bars consist initially of easily detachable extensions of one component frame or of respective component frames. It is known that in slide frames made of plastics material, the two component frames or one-half frame sections are made by injection molding so that the bars can be molded integrally with the component frame or frames without difficulty. In that case, the spreading bars constitute extensions of the component frame or frames and are supplied to the buyer together with the component frames. It will then be sufficient for the user to break the bars from the component frame proper. This can easily be accomplished if the component frame and spreading bar are joined only by narrow webs. When the spreading bars have been separated or broken off, they can easily be inserted into grooves provided for that purpose in the component frames.

Figure 2:
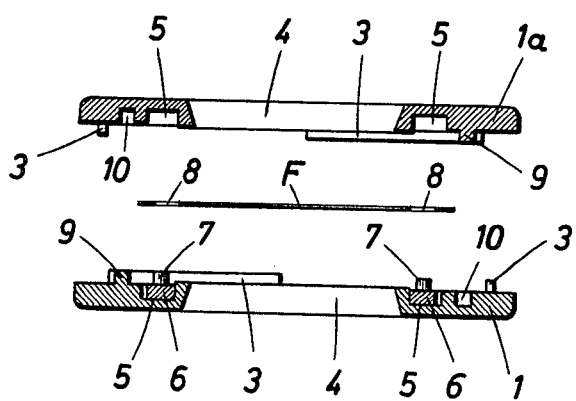
Figure 3:
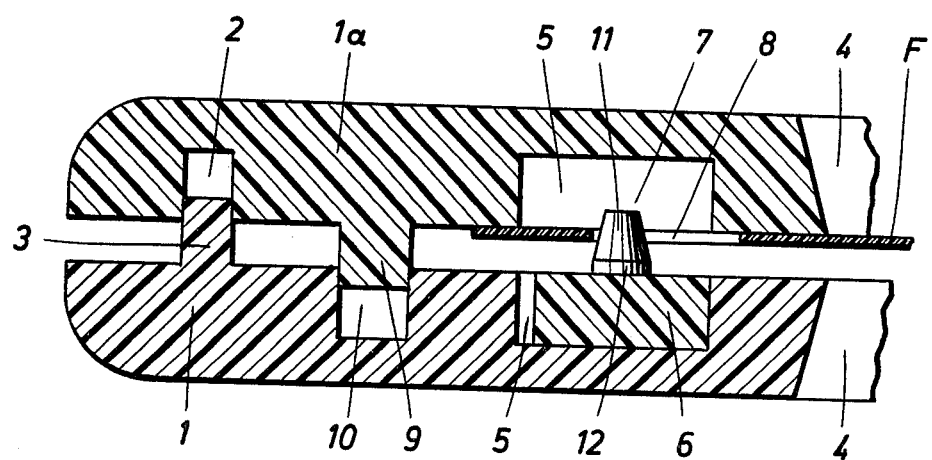
Figure 4:
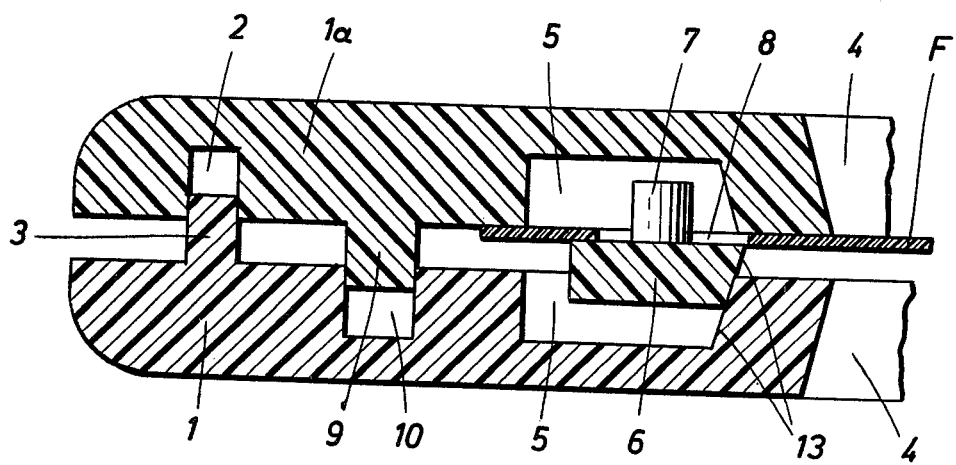

Two embodiments of the invention are shown by way of example on the accompanying drawings, in which FIG. 1 shows the two component frames of a slide frame viewed from the side which faces the slide film, FIG. 2 is a transverse sectional view taken on lines II—II in FIG. 1 and showing the component frames, FIG. 3 is an enlarged transverse sectional view showing a slide member of a partially closed slide frame having conically tapered teeth, and FIG. 4 is a view similar to FIG. 3 and showing a slide frame having spreading bars which are shiftable by suitably inclined camming faces.

An unglazed slide frame shown on the drawing comprises two component frames 1 and 1a, which are provided with recesses 2 and projections 3 on their sides which face each other and the film F. As the component frames are joined, their recesses 2 and projections 3 interengage like snap fasteners. A rectangular window for exposing a slide film is designated 4.

On the side facing the slide film F, each component frame 1 and 1a is provided with grooves 5 which extend along the longitudinal edges of the window. Spreading bars 6 inserted into the grooves 5 are guided by the latter for a limited longitudinal displacement. The spreading bars 6 carry teeth 7 which fit into perforations 8 formed in the slide film F. 9 and openings 10 are closely spaced from and parallel to the grooves 5 and constitute additional coupling elements for cooperation with the openings and projections of the other component frame. The spreading bars 6 may be made as easily separable portions of respective component frames 1, 1a, as is indicated in dash-dot lines in FIG. 1, so that the required spreading bars will always be supplied to the buyer together with the frame.

To facilitate the application of the slide film F to the spreading bars 6 in a slide frame in which the retaining function of these spreading bars 6 is not adversely affected when the slide frame is closed, the spreading bars 6 shown in FIG. 3 have conical teeth 7. Each of these teeth 7 has a conically tapered portion 11 which merges into a cylindrical portion 12 disposed adjacent to the root of the teeth. When the two component frames 1 and 1a are forced together, the slide film F is forced along the outer flanks of the teeth 7 onto the portions 12, which then interengage with the outer edges of the perforations 8. Because the spreading bars 6 bear on the inner side face of each groove 5, the slide film is held flat without being stressed in tension. A tensile force will not be applied until the film F tends to warp under the action of heat. Such warping will be prevented by the teeth 7, which cannot yield.

An alternative arrangement, which also provides for a clearance that is sufficient for the application of the slide film F to the teeth 7 whereas the restraining function of the teeth in the closed frame is ensured, is shown in FIG. 4. In this case the spreading bars 6 and the grooves 5 are provided with suitably inclined camming surfaces 13 which force the spreading bars against the bottom of each groove and shift them away from the window 4 at the same time as the frame is closed. In that arrangement too, the film is held flat under no tension when the film is not loaded and the film can be inserted without difficulty. In a frame having inclined camming surfaces 13, the spreading bars 6 obviously can be restrained only by the component frames rather than by each other.

Whereas only unglazed slide frames are shown on the drawings, the invention can obviously be applied also to glazed slide frames.

What is claimed is:

1. A slide frame comprising
   (a) two component frames each defining a rectangular window having two opposite parallel sides and including means for joining the two component frames together to form the slide frame, the windows registering in the joined component frames, and the two joined component frames being adapted to clamp a slide film therebetween, the slide film having perforations on opposite sides thereof and arranged to extend along the two opposite parallel sides of the registering windows, and the perforations having edges remote from the parallel sides of the registering windows,
   (b) two film spreading bars arranged between the two joined component frames along the two opposite parallel sides of the registering windows for limited longitudinal displacement in the direction of said sides, each of the bars having teeth for interengaging with the perforations in the slide film and clamping the slide film between the component frames to hold the film in a plane, and (c) means for holding the spreading bars between the component frames with their teeth engaging the remote edges of the film perforations whereby the film is held under tension between the component frames, the holding means comprising a recess along a respective one of the sides in one of the component frames for receiving a respective one of the spreading bars, the recess having a camming surface sloping away from the one side, and the one spreading bar having a camming surface cooperating with the camming surface of the recess whereby the one spreading bar is forced away from the one side when the two component frames are joined.

2. The slide frame of claim 1, wherein the two opposite parallel sides are longitudinal sides of the windows.

3. A slide frame comprising (a) two component frames each defining a rectangular window having two opposite parallel sides and including means for joining the two component frames together to form the slide frame, the windows registering in the joined component frames, and the two joined component frames being adapted to clamp a slide film therebetween, the slide film having perforations on opposite sides thereof and arranged to extend along the two opposite parallel sides of the registering windows, and the perforations having edges remote from the parallel sides of the registering windows, (b) two film spreading bars arranged between the two joined component frames along the two opposite parallel sides of the registering windows for limited longitudinal displacement in the direction of said sides, each of the bars having teeth for interengaging with the perforations in the slide film and clamping the slide film between the component frames to hold the film in a plane, the teeth of at least one of the spreading bars having a root portion and a side face remote from an associated one of the parallel sides, the remote side face having a portion sloping away from the one side, and (c) means for holding the spreading bars between the component frames with their teeth engaging the remote edges of the film perforations whereby the film is held under tension between the component frames.

4. The slide frame of claim 3, wherein the root portion of the teeth has a face remote from the one side extending perpendicularly to the plane of the film.

* * * * *